US008831631B2

(12) United States Patent
Cho et al.

(10) Patent No.: US 8,831,631 B2
(45) Date of Patent: Sep. 9, 2014

(54) APPARATUS AND METHOD FOR IDENTIFYING TERMINAL LOCATED IN SPACE INCLUDING SMALL BASE STATION

(75) Inventors: Kyong Tak Cho, Daejeon (KR); Jun Sik Kim, Seoul (KR); Byung Han Ryu, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 351 days.

(21) Appl. No.: 13/428,547

(22) Filed: Mar. 23, 2012

(65) Prior Publication Data

US 2012/0244878 A1 Sep. 27, 2012

(30) Foreign Application Priority Data

Mar. 25, 2011  (KR) .................. 10-2011-0026973
Dec. 27, 2011  (KR) .................. 10-2011-0143000

(51) Int. Cl.
H04W 24/00    (2009.01)
H04M 11/00    (2006.01)
H04W 4/00     (2009.01)
H04W 36/00    (2009.01)
G01S 11/06    (2006.01)
G01S 5/02     (2010.01)
H04W 64/00    (2009.01)

(52) U.S. Cl.
CPC .............. G01S 11/06 (2013.01); *H04W 64/003* (2013.01); G01S 5/02 (2013.01)
USPC ................ 455/456.1; 455/421; 455/422.1; 455/444

(58) Field of Classification Search
CPC ....... H04W 4/02; H04W 4/021; H04W 4/023; H04W 52/0241; H04W 64/003; H04W 36/30; H04W 16/30; H04W 16/32; H04W 16/20
USPC ........................... 455/456.1, 421, 422.1, 444
See application file for complete search history.

(56) References Cited

U.S. PATENT DOCUMENTS

| 7,920,870 | B1 * | 4/2011 | Bhatia et al. ............... 455/444 |
| 2009/0253421 | A1 | 10/2009 | Camp, Jr. et al. |
| 2009/0253461 | A1 * | 10/2009 | Kuwahara .................. 455/561 |
| 2010/0234039 | A1 | 9/2010 | Kwon et al. |
| 2012/0129536 | A1 * | 5/2012 | Zou et al. .................... 455/444 |

FOREIGN PATENT DOCUMENTS

KR      1020090120939 A     11/2009

* cited by examiner

*Primary Examiner* — Marisol Figueroa
(74) *Attorney, Agent, or Firm* — Ladas & Parry LLP

(57) ABSTRACT

The present invention provides a method including two operations of a first operation and a second operation. The first operation may determine between a terminal located in a space including the small base station and a terminal located in a space excluding the small base station based on a value reported by a terminal. The second operation may be performed using information received from a neighboring macro base station in response to the determination failing to be performed in the first operation, thereby ultimately discriminating between an area including the small base station and an area excluding the small base station corresponding to a location of a terminal.

20 Claims, 10 Drawing Sheets

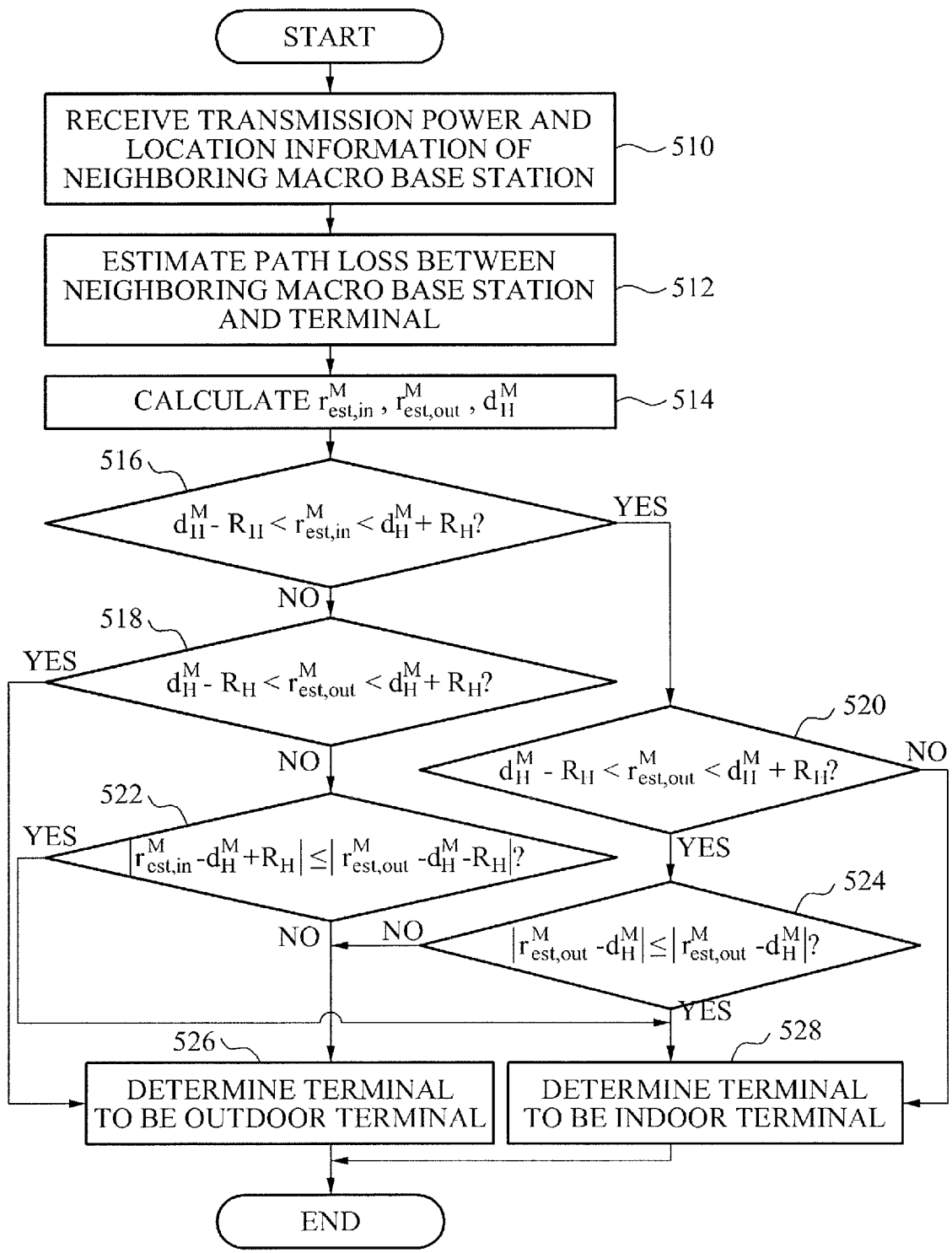

CASE 1

CASE 2

CASE 3

CASE 4

APPARATUS AND METHOD FOR IDENTIFYING TERMINAL LOCATED IN SPACE INCLUDING SMALL BASE STATION

CROSS-REFERENCE TO RELATED APPLICATION

This application claims the benefit of Korean Patent Application No. 10-2011-0026973, filed on Mar. 25, 2011 and Korean Patent Application No. 10-2011-0143000, filed on Dec. 27, 2011, in the Korean Intellectual Property Office, the disclosure of which is incorporated herein by reference.

BACKGROUND

1. Field of the Invention

The present invention relates to a method of discriminating, by a small base station, between an area including the small base station and an area excluding the small base station corresponding to a location of a user accessing the small base station that has a limited area of coverage, such as an in-house area, in a mobile communication system.

2. Description of the Related Art

A femtocell service has been proposed to enhance an indoor coverage area, enhance a communication quality, and provide various communication services, and the like. A femtocell may generally correspond to a femto base station (hereinafter, referred to as a small base station) installed in a house, may have a transmission range of about 10 to 20 meters (m), and may be characterized by a low price, a direct installation by a user, a low transmission power, and the like. Here, the small base station may provide a mobile communication service through a connection to an Internet based backhaul such as a digital subscriber loop (DSL), a cable modem, and the like.

Discriminating between an area including the small base station and an area excluding the small base station corresponding to a location of a user accessing the small base station may correspond to a significant technology since a quality of service for users located in a space excluding the small base station may be greatly lowered by a power loss when a signal power transmitted during a service to users passes through an outdoor wall. That is, the small base station may efficiently control power by discriminating between an area including the small base station and an area excluding the small base station corresponding to a location of a user being provided with a service. To resolve issues described in the foregoing, a conventional art may discriminate between a user located in a space including the small base station and a user located in a space excluding the small base station using a global positioning system (GPS) function of a user terminal. However, this may require an additional hardware and communication function at a user (or terminal) side.

SUMMARY

An aspect of the present invention provides an apparatus and method for discriminating between a terminal located in a space including a small base station and a terminal located in a space excluding the small base station.

Another aspect of the present invention also provides a method of discriminating, by a small base station, between an area including the small base station and an area excluding the small base station corresponding to a location of a user accessing the small base station that has a limited area of coverage, such as an in-house area in a mobile communication system.

Still another aspect of the present invention also provides a method, including two operations of a first operation and a second operation, that performs a determination based on a value reported by a terminal in the first operation, and performs the second operation using information received from a neighboring macro base station, in response to the determination failing to be performed in the first operation, thereby ultimately discriminating between an area including the small base station and an area excluding the small base station corresponding to a location of a user.

According to an aspect of the present invention, there is provided a method of discriminating between a terminal located in a space including the small base station and a terminal located in a space excluding the small base station, the method including calculating a path loss between a small base station and a terminal, calculating, using the path loss, a distance $r_{est,in}^{H}$ of the small base station based indoors indicating a distance between the small base station and the terminal when the terminal is presumed to be placed within an area including the small base station, calculating, using the path loss, a distance $r_{est,out}^{H}$ of the small base station, based outdoors, indicating a distance between the small base station and the terminal when the terminal is presumed to be placed within an area excluding the small base station, and performing a first determining operation to determine whether the terminal is placed within the area excluding the small base station by comparing a distance $r_{est,in}^{H}$ of the small base station based indoors and the distance $r_{est,out}^{H}$ of the small base station based outdoors, with a radius $R_H$ available for the small base station to provide a service using a current amount of power.

According to another aspect of the present invention, there is provided an apparatus for discriminating between a terminal located in a space including the small base station and a terminal located in a space excluding the small base station, the apparatus including a path loss calculator to calculate a path loss between a small base station and a terminal, an indoor distance calculator to calculate, using the path loss, a distance $r_{est,in}^{H}$ of the small base station based indoors, indicating a distance between the small base station and the terminal when the terminal is presumed to be placed within an area including the small base station, an outdoor distance calculator to calculate, using the path loss, a distance $r_{est,out}^{H}$ of the small base station based outdoors, indicating a distance between the small base station and the terminal when the terminal is presumed to be placed within an area excluding the small base station, and a first determining unit to determine whether the terminal is placed within the area excluding the small base station by comparing a distance $r_{est,in}^{H}$ of the small base station based indoors and the distance $r_{est,out}^{H}$ of the small base station based outdoors with a radius $R_H$ available for the small base station to provide, by, a service using a current amount of power.

According to an embodiment of the present invention, it is possible to discriminate between an area including the small base station and an area excluding the small base station corresponding to a location of a terminal serviced by a small base station. A method of discriminating between an area including the small base station and an area excluding the small base station may include two operations of a first operation and a second operation. The first operation may perform a determination based on a value reported by a terminal. The second operation may be performed, in response to the first operation failing to be performed, using information received from a neighboring macro base station, thereby ultimately discriminating between an area including the small base station and an area excluding the small base station corresponding to a location of a user. By performing the operations described in the foregoing, the small base station may efficiently and accurately control power. Enhancement of a function for controlling power may lead to an enhancement in a quality of service provided to a user.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5 is a flowchart illustrating an operation of discriminating, by a small base station, between a terminal located in a space including the small base station and a terminal located in a space excluding the small base station based on information received from a neighboring macro base station according to embodiments of the present invention;

DETAILED AILED DESCRIPTION

Figure 1:
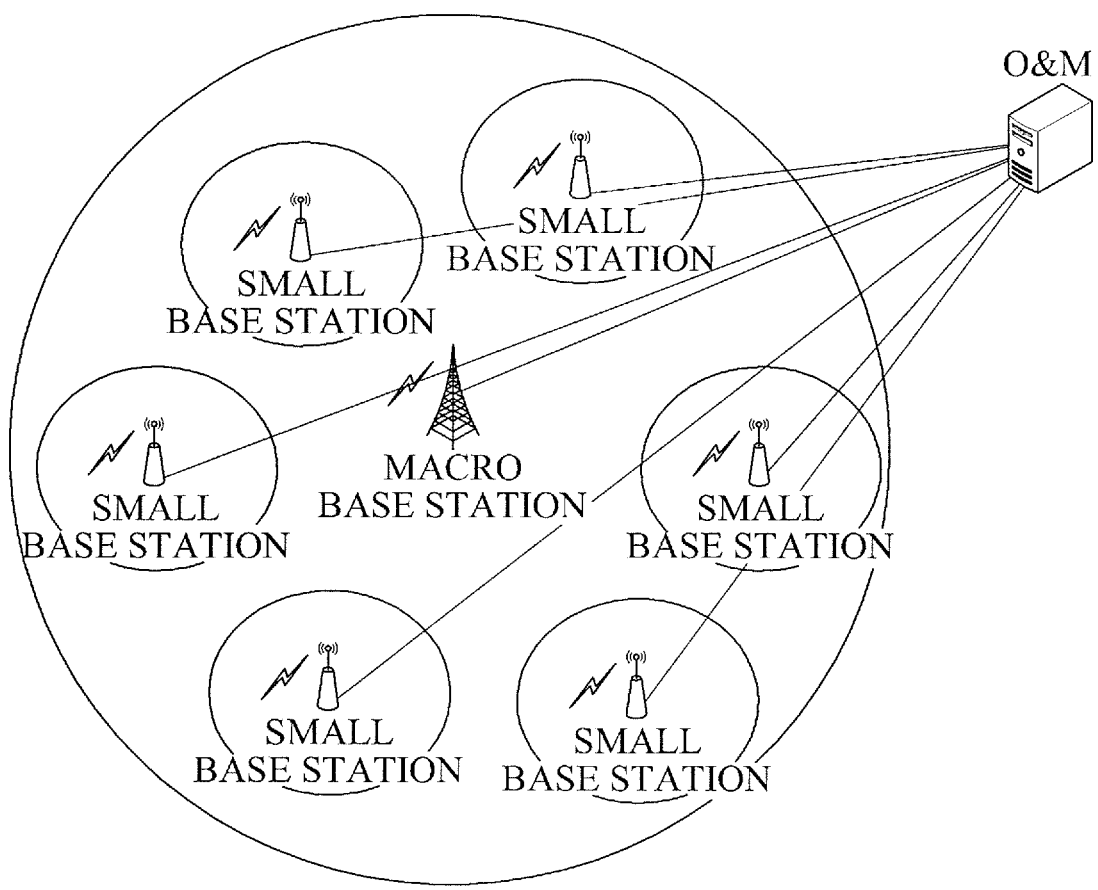
FIG. 1 is a diagram illustrating a configuration of a wireless system including a macro base station and multiple small base stations according to embodiments of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a wireless system including a macro base station and multiple small base stations according to embodiments of the present invention.

FIG. 1 illustrates a system in which multiple small base stations coexist within a macro cell formed by an installed macro base station. All base stations, macro and small, may exchange a message through an S1 interface or an X2 interface. Each base station may store location information registered when each base station is first installed. An operating and maintenance (O&M) may control an operation and maintenance of the macro base station and all of the small base stations.

Figure 2:
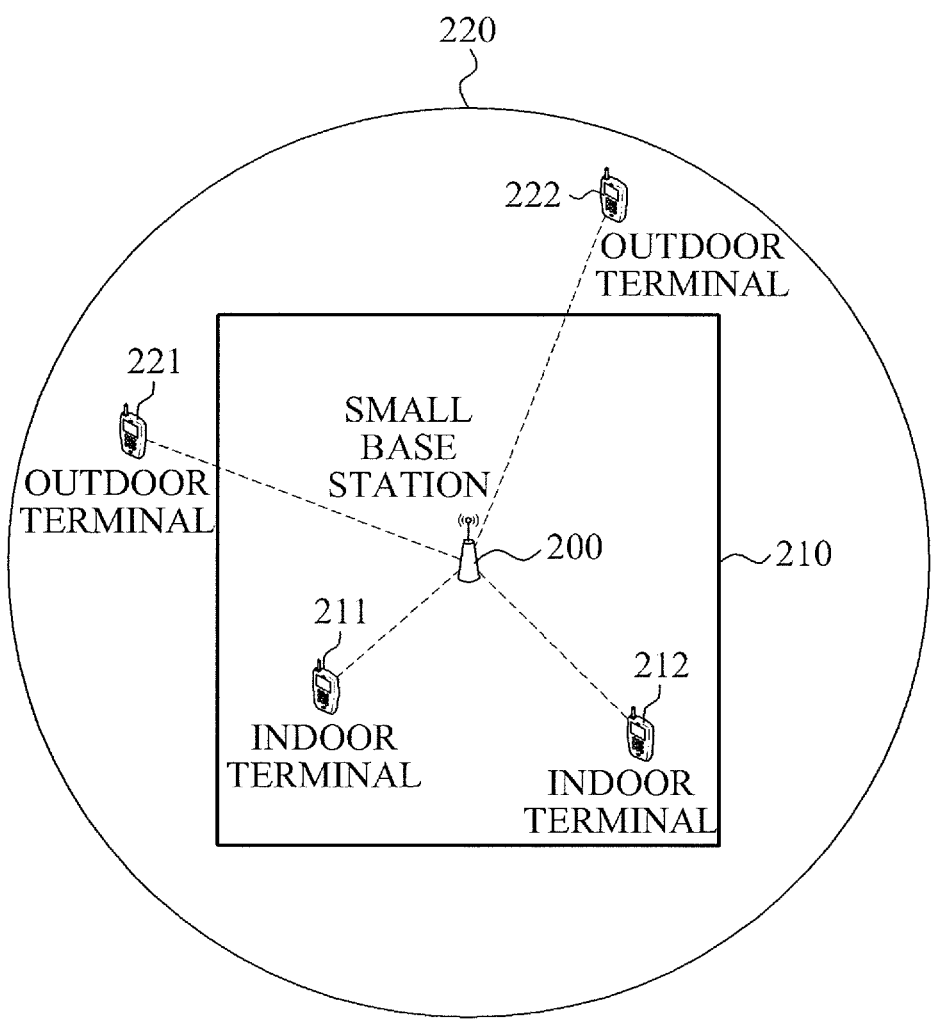
FIG. 2 is a diagram illustrating a terminal located in a space including the small base station and a terminal located in a space excluding the small base station connected to a small base station according to embodiments of the present invention.

FIG. 2 is a diagram illustrating a terminal located in a space including a small base station and a terminal located in a space excluding the small base station connected to a small base station according to embodiments of the present invention.

In general, a small base station 200 may be located within an indoor area 210. Thus, whether a terminal is located in a space including a small base station or a space excluding the small base station may indicate whether the terminal is located in an indoor area or an outdoor area. On occasion, a service of the small base station 200 may be available to terminals located in a space excluding the small base station 221 and 222 depending on a size of a cell region 220 according to a downlink transmission power setting of the small base station 200. Thus, terminals being provided with a service by the small base station 200 may correspond to terminals located in a space including the small base station 211 and 212 and the terminals located in a space excluding the small base station 221 and 222.

Figure 3:
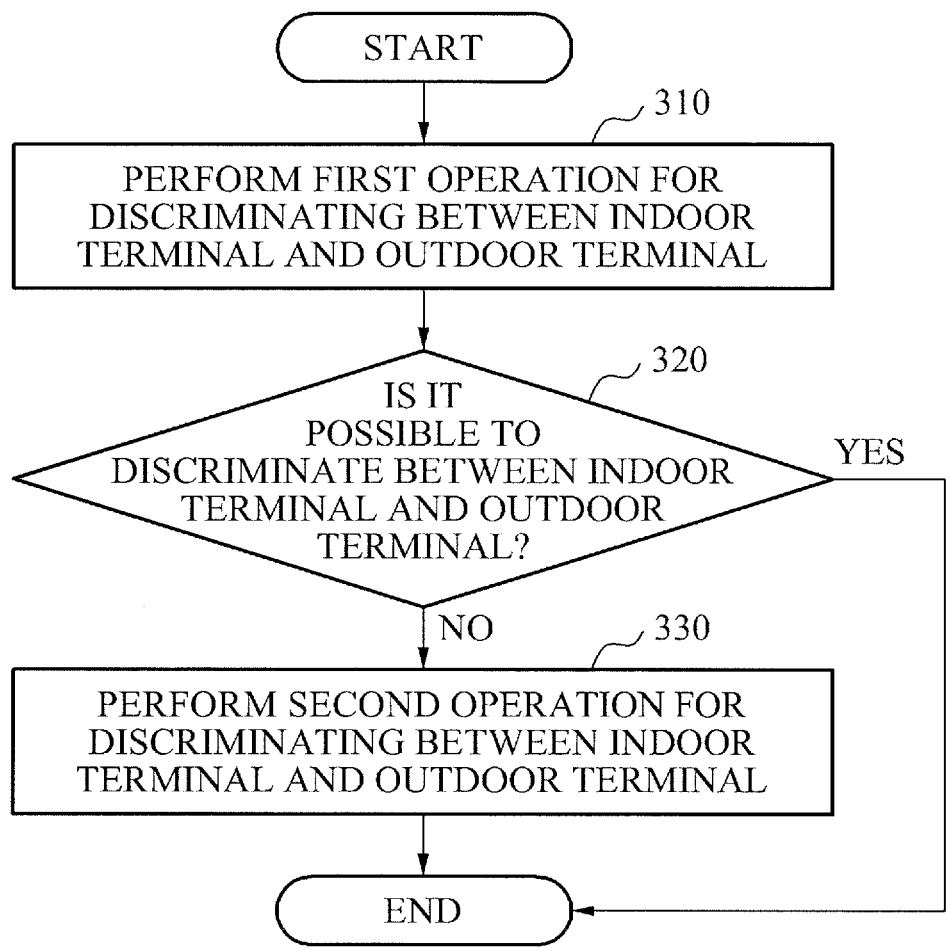
FIG. 3 is a flowchart illustrating an operation of discriminating, by a small base station, between a terminal located in a space including the small base station and a terminal located in a space excluding the small base station according to embodiments of the present invention.

FIG. 3 is a flowchart illustrating an operation of discriminating, by a small base station, between a terminal located in a space including the small base station and a terminal located in a space excluding the small base station according to embodiments of the present invention.

Referring to FIG. 3, a small base station may discriminate between a user located in a space including the small base station and a user located in a space excluding the small base station through two operations.

First, in operation 310, the small base station may perform a first determination for discriminating between a terminal located in a space including the small base station and a terminal located in a space excluding the small base station.

In operation 320, the small base station may verify whether it is possible to discriminate between a terminal located in a space including the small base station and a terminal located in a space excluding the small base station.

The small base station may terminate an algorithm when it is possible to discriminate between a terminal located in a space including the small base station and a terminal located in a space excluding the small base station as a result of verification in operation 320.

In operation 330, the small base station may perform a second determination of discriminating between a terminal located in a space including the small base station and a terminal located in a space excluding the small base station when discrimination fails between a terminal located in a space including the small base station and a terminal located in a space excluding the small base station as a result of verification in operation 320.

Figure 4:
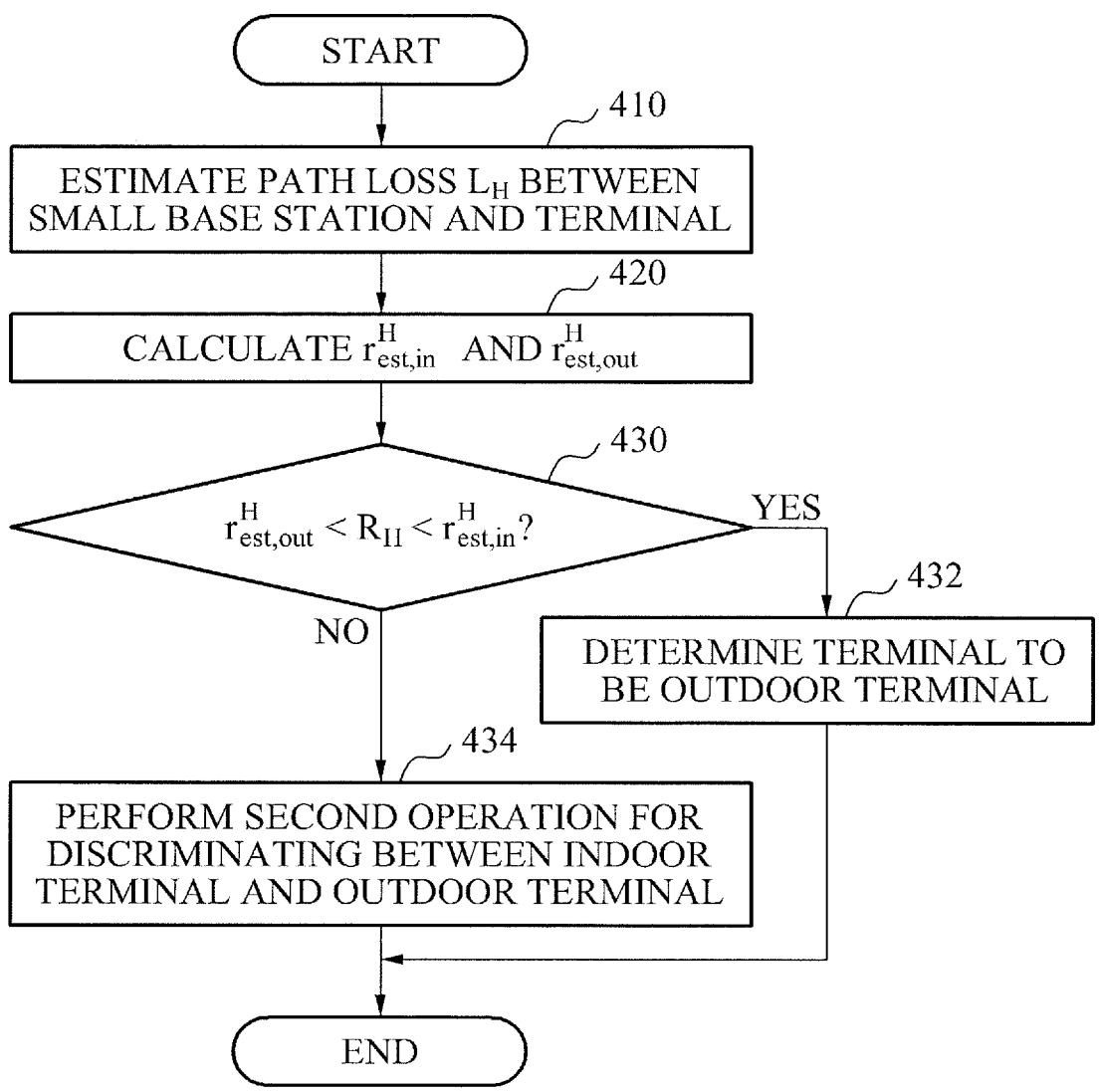
FIG. 4 is a flowchart illustrating an operation of discriminating, by a small base station, a terminal located in a space excluding the small base station from a terminal located in a space including the small base station based on information received from a terminal according to embodiments of the present invention.

FIG. 4 is a flowchart illustrating an operation of discriminating, by a small base station, a terminal located in a space excluding the small base station from a terminal located in a space including the small base station based on information received from a terminal according to embodiments of the present invention.

FIG. 4 corresponds to the first determination for discriminating between a terminal located in a space including the small base station and a terminal located in a space excluding the small base station of FIG. 3.

Referring to FIG. 4, in operation 410, a small base station may calculate a path loss $L_H$ between the small base station and a terminal. In this instance, the path loss $L_H$ may be calculated using Equation 1.

$$L_H = \frac{RSRP}{P_{ref}} \quad \text{[Equation 1]}$$

Here, $L_H$ denotes a path loss between the small base station and the terminal, $P_{ref}$ denotes a transmission power used when a small base station transmits a reference signal, and a reference signal received power (RSRP) denotes a power when a reference signal is received.

In operation 420, the small base station may calculate a distance $r_{est,in}^H$ of the small base station based indoors and a distance $r_{est,out}^H$ of the small base station based outdoors.

In this instance, the distance $r_{est,in}^H$ of the small base station based indoors may correspond to a distance between the small base station and the terminal when the terminal is presumed to be placed within an area including the small base station. The distance $r_{est,in}^H$ may be calculated using Equation 2.

$$r_{est,in}^H = 10^{\frac{L_H - 38.46}{20}} \quad \text{[Equation 2]}$$

Here, $r_{est,in}^H$ denotes a distance between the small base station and the terminal when the terminal is presumed to be placed within an area including the small base station, and $r_{est,in}^H$ denotes a path loss between the small base station and the terminal.

In Equation 2, 10 corresponds to a value generated by taking a value of ( ) from $\log_{10}$( ), 20 corresponds to a value generated by placing an exponent 2 of P(dB)=10 $\log_{10}$ {P(W)²} in front of the right side when changing a value of power to a logarithmic scale, and 38.46 corresponds to a value determined based on a characteristic of a frequency and a channel in which communication is performed.

The distance $r_{est,out}^H$ of the small base station based outdoors may correspond to a distance between the small base station and the terminal when the terminal is presumed to be placed within an area excluding the small base station. The distance $r_{est,out}^H$ may be calculated using Equation 3.

$$r_{est,out}^H = \min\left\{10^{\frac{L_H - L_{OW} - 38.46}{20}}, 10^{\frac{L_H - L_{OW} - 15.3}{37.6}}\right\} \quad \text{[Equation 3]}$$

Here, $r_{est,out}^H$ denotes a distance between the small base station and the terminal when the terminal is presumed to be placed within an area excluding the small base station, $L_H$ denotes a path loss between the small base station and the terminal, and $L_{OW}$ denotes a path loss due to an outdoor wall.

In Equation 3, 10 corresponds to a value generated by taking a value of ( ) from $\log_{10}$( ), 20 corresponds to a value generated by putting 2 of P(dB)=10 $\log_{10}$ {P(W)²} in front of the right side when changing a value of power to a logarithmic scale, and 38.46, 15.3, and 37.6 correspond to values determined based on a characteristic of a frequency and a channel in which communication is performed.

In operation 430, the small base station may verify whether an inequality $r_{est,out}^H < R_H < r_{est,in}^H$ is satisfied.

Here, the distance $r_{est,out}^H$ may be less than the distance $r_{est,in}^H$ at all times. That is, an inequality $r_{est,out}^H < r_{est,in}^H$ is satisfied.

An inequality $r_{est,out}^H < R_H$ indicates that a distance between the terminal presumed to be placed within an area excluding the small base station and the small base station is less than a radius $R_H$ available for a service to be provided by the small base station. When the terminal is presumed to be placed within an area excluding the small base station, it may be possible to determine that the terminal is within a radius of a base station, and is receiving a service.

Whereas, when an inequality $r_{est,out}^H > R_H$ is satisfied, the terminal may not exist since the terminal is presumed to be placed within an area excluding the small base station, and a distance to a user is greater than a radius available for a service provided by a base station. That is, the terminal is provided with a service outside of the radius available for a service provided by the base station.

When an inequality $r_{est,out}^H < R_H < r_{est,in}^H$ is satisfied, a user may be determined to be a user located in a space excluding the small base station since a distance to the user is less than a radius of a base station in a case where the user is presumed to be located within an area including the small base station, and is greater than a radius of a base station in a case where the user is presumed to be located within an area excluding the small base station.

In operation 432, the small base station may determine the terminal to be a terminal located in a space excluding the small base station in response to the inequality $r_{est,out}^H < R_H < r_{est,in}^H$ being satisfied, as a result of verification in operation 430.

In operation 434, the small base station may perform a second determination of discriminating between a terminal located in a space including the small base station and a terminal located in a space excluding the small base station in response to the inequality $r_{est,out}^H < R_H < r_{est,in}^H$ failing to be satisfied as a result of verification in operation 430. The second determination will be further described with reference to FIG. 5.

FIG. 5 is a flowchart illustrating an operation of discriminating, by a small base station, between a terminal located in a space including the small base station and a terminal located in a space excluding the small base station based on information received from a neighboring macro base station according to embodiments of the present invention. FIG. 5 is related to the second determination of discriminating between a terminal located in a space including the small base station and a terminal located in a space excluding the small base station of FIG. 3. FIG. 5 will be described with reference to FIGS. 6A, 6B, 6C, and 6D. FIGS. 6A, 6B, 6C, and 6D are diagrams illustrating cases occurring during the operation of discriminating, of FIG. 5.

Referring to FIG. 5, in operation 510, a small base station may receive a transmission power and location information for a neighboring macro base station.

In operation 512, the small base station may calculate a path loss between the macro base station and the terminal.

In operation 514, the small base station may calculate a distance $r_{est,in}^M$ of the macro base station based indoors, a distance $r_{est,out}^M$ of the macro base station based outdoors, and a distance $d_H^M$ of base station.

Here, $r_{est,in}^M$ denotes a distance between the macro base station and the terminal when the terminal is presumed to be placed within an area including the small base station of the small base station, $r_{est,out}^M$ out denotes a distance between the macro base station and the terminal when the terminal is presumed to be placed within an area excluding the small base station of the small base station, and $d_H^M$ denotes a distance between the macro base station and the small base station. In this instance, the distance $d_H^M$ may be calculated using a received location of the macro base station and a location of the small base station.

Figure 6A:
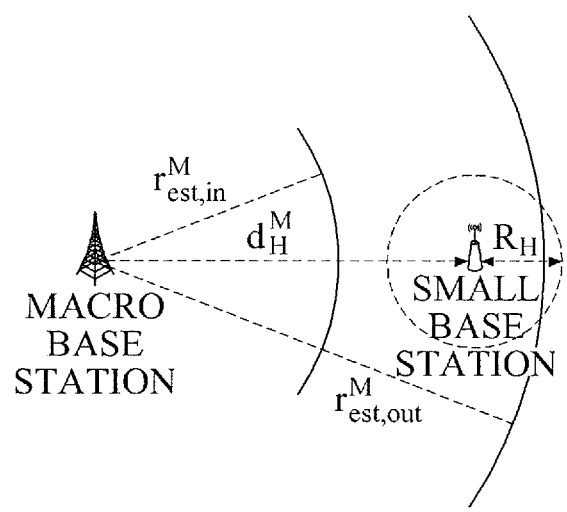
FIGS. 6A, 6B, 6C, and 6D are diagrams illustrating cases occurring during the operation of FIG. 5.
Figure 6B:
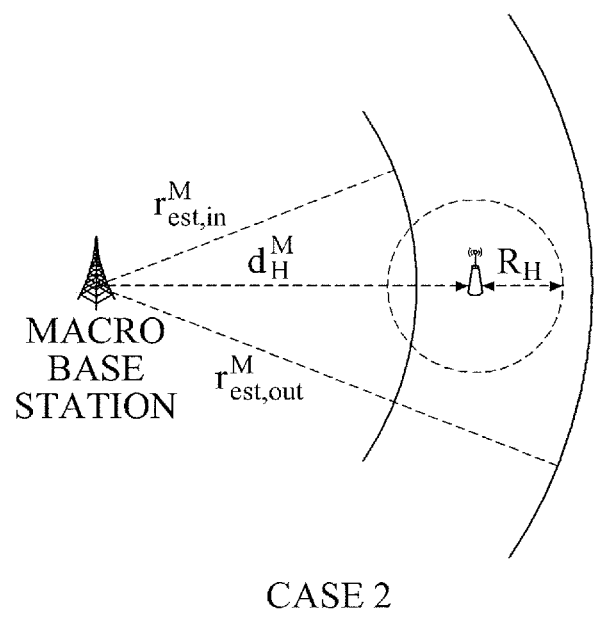
Figure 6C:
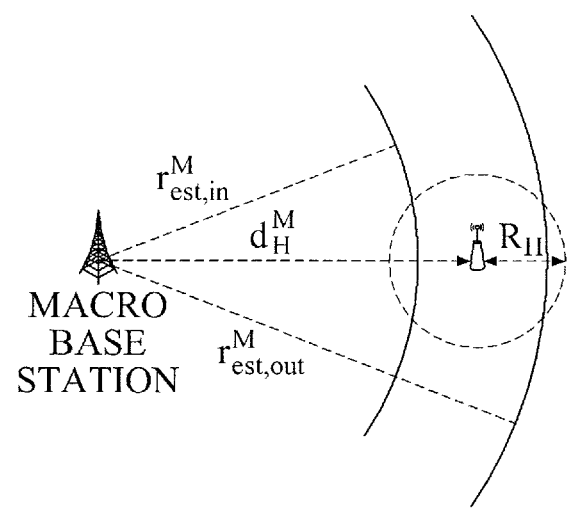
Figure 6D:
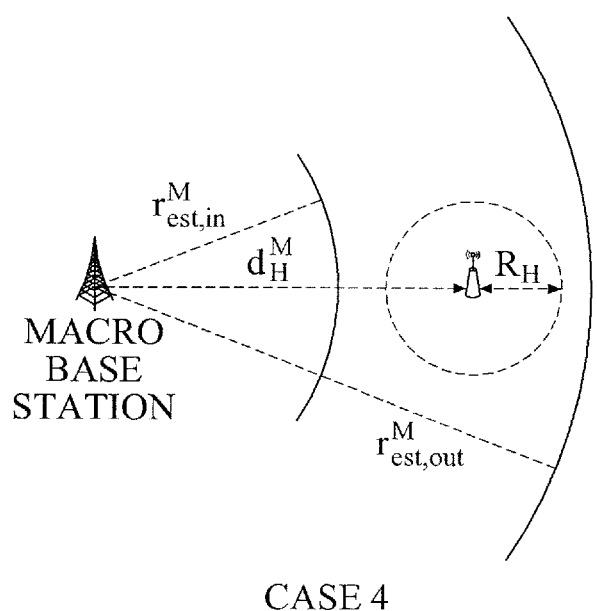

In operation 516, the small base station may verify whether an inequality $d_H^M - R_H < r_{est,in}^M < d_H^M + R_H$ is satisfied. Whether a radius of the distance $r_{est,in}^M$ intersects a radius of the small base station may be determined based on whether the inequality $d_H^M - R_H < r_{est,in}^M < d_H^M + R_H$ is satisfied. Referring to FIGS. 6B and 6C, Case 2 and Case 3 may satisfy the inequality $d_H^M - R_H < r_{est,in}^M < d_H^M + R_H$.

In response to the inequality $d_H^M - R_H < r_{est,in}^M < d_H^M + R_H$ being satisfied as a result of verification in operation 516, the small base station may verify whether an inequality $d_H^M - R_H < r_{est,out}^M < d_H^M + R_H$ is satisfied in operation 520. Whether a radius of the distance $r_{est,out}^M$ intersects a radius of the small base station may be determined based on whether the inequality $d_H^M - R_H < r_{est,out}^M < d_H^M + R_H$ is satisfied. Referring to FIGS. 6A and 6C, Case 1 and Case 3 respectively, may satisfy the inequality $d_H^M - R_H < r_{est,out}^M < d_H^M + R_H$.

In operation 528, the small base station may determine the terminal to be a terminal located in a space including the small base station in response to the inequality $d_H^M - R_H < r_{est,out}^M < d_H^M + R_H$ failing to be satisfied as a result of determination in operation 520, which may correspond to Case 2.

In operation 524, the small base station may verify whether an inequality $|r_{est,in}^M - d_H^M| \leq |r_{est,out}^M - d_H^M|$ is satisfied in response to the inequality $d_H^M - R_H < r_{est,out}^M < d_H^M + R_H$ being satisfied as a result of determination in operation 520, which may correspond to Case 3. That is, one of a radius of the distance $r_{est,in}^M$ and a radius of the distance $r_{est,out}^M$ may be closer to the small base station, when compared to one another, and may be determined to be a location of the terminal.

In operation 528, the small base station may determine the terminal to be a terminal located in a space including the small base station in response to the inequality $|r_{est,in}^M - d_H^M| \leq |r_{est,out}^M - d_H^M|$ being satisfied as a result of determination in operation 524.

In operation 526, the small base station may determine the terminal to be a terminal located in a space excluding the small base station in response to the inequality $|r_{est,in}^M - d_H^M| \leq |r_{est,out}^M - d_H^M|$ failing to be satisfied as a result of determination in operation 524.

In response to the inequality $d_H^M - R_H < r_{est,in}^M < d_H^M + R_H$ failing to be satisfied as a result of verification in operation 516, the small base station may verify whether an inequality $d_H^M - R_H < r_{est,out}^M < d_H^M + R_H$ is satisfied in operation 518.

In operation 526, the small base station may determine the terminal to be a terminal located in a space excluding the small base station in response to the inequality $d_H^M - R_H < r_{est,out}^M < d_H^M + R_H$ being satisfied as a result of determination in operation 518, which may correspond to Case 1.

In operation 522, the small base station may verify whether an inequality $|r_{est,in}^M - d_H^M| \leq |r_{est,out}^M - d_H^M|$ is satisfied in response to the inequality $d_H^M - R_H < r_{est,out}^M < d_H^M + R_H$ failing to be satisfied as a result of determination in operation 518, which may correspond to Case 4. That is, one of a radius of the distance $r_{est,in}^M$ and a radius of the distance $r_{est,out}^M$ may be closer to the small base station, when compared to one another, and may be determined to be a location of the terminal.

In operation 528, the small base station may determine the terminal to be a terminal located in a space including the small base station in response to the inequality $d_H^M - R_H < r_{est,out}^M < d_H^M + R_H$ being satisfied as a result of verification in operation 522.

In operation 526, the small base station may determine the terminal to be a terminal located in a space excluding the small base station in response to the inequality $d_H^M - R_H < r_{est,out}^M < d_H^M + R_H$ failing to be satisfied as a result of verification in operation 522.

Hereinafter, an apparatus for discriminating between a terminal located in a space including the small base station and a terminal located in a space excluding the small base station that operates as described in the foregoing, according to embodiments of the present invention, will be described with reference to FIG. 7.

Figure 7:
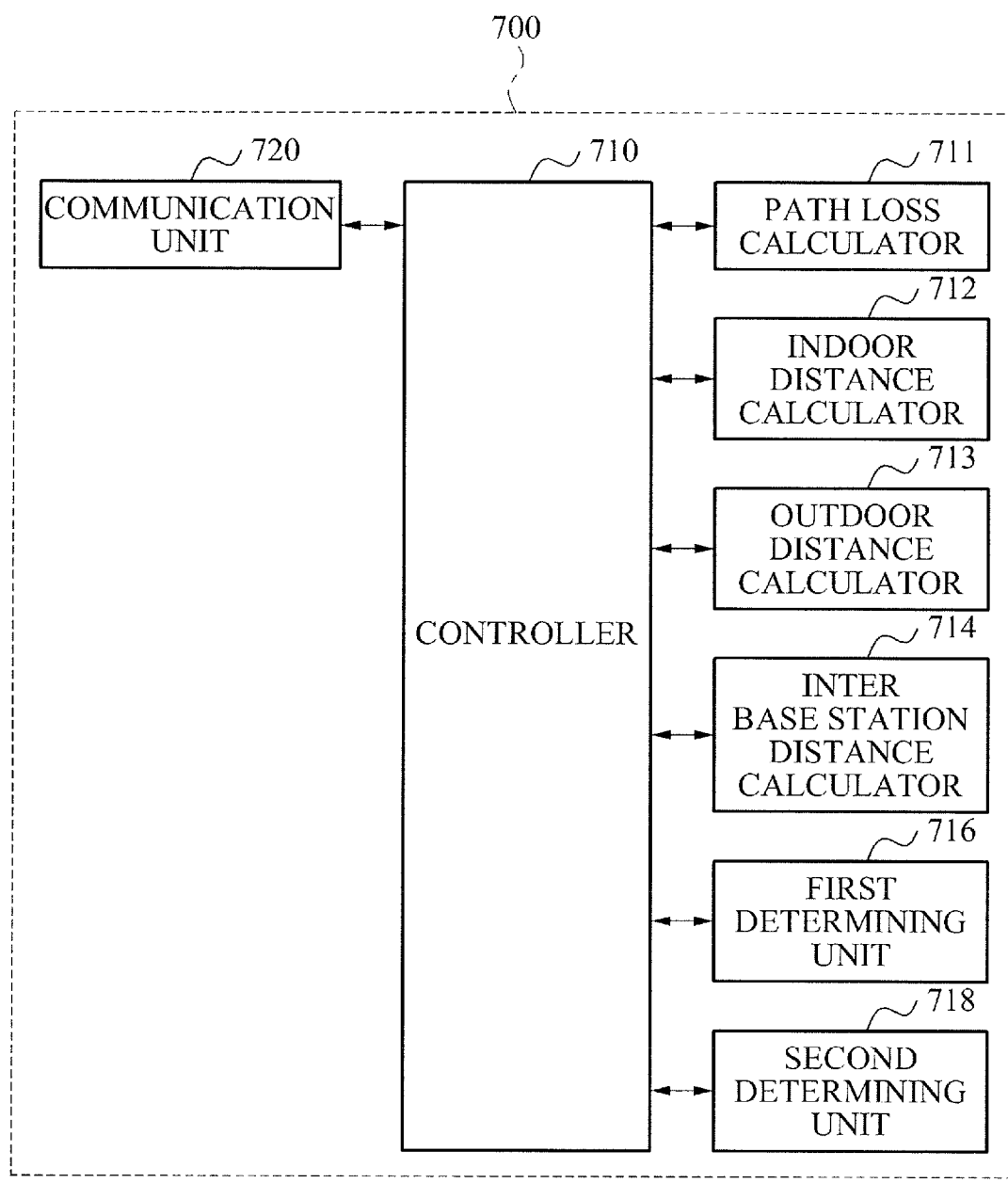
FIG. 7 is a diagram illustrating an apparatus for discriminating, by a small base station, between a terminal located in a space including the small base station and a terminal located in a space excluding the small base station according to embodiments of the present invention.

FIG. 7 is a diagram illustrating an apparatus for discriminating, by a small base station, between a terminal located in a space including the small base station and a terminal located in a space excluding the small base station according to embodiments of the present invention.

Referring to FIG. 7, a small base station 700 may include a controller 710, a path loss calculator 711, an indoor distance calculator 712, an outdoor distance calculator 713, an inter base station distance calculator 714, a first determining unit 716, a second determining unit 718, and a communication unit 720.

The communication unit 720 may communicate with a terminal within a cell region of the small base station 700, and may exchange a message through an S1 interface or an X2 interface with a neighboring macro base station and neighboring small base stations.

The path loss calculator 711 may calculate a path loss between a small base station and a terminal.

The path loss calculator 711 may calculate a path loss between the macro base station and the terminal by receiving a transmission power from a macro base station when a location of the terminal fails to be determined as a result of determination by the first determining unit 716.

The indoor distance calculator 712 may calculate, using the path loss, a distance $r_{est,in}^H$ base station based indoors which indicates a distance between the small base station and the terminal when the terminal is presumed to be placed within an area including the small base station.

The indoor distance calculator 712 may calculate, using the path loss between the macro base station and the terminal, a distance $r_{est,in}^M$ of the macro base station based indoors which indicates a distance between the macro base station and the terminal when the terminal is presumed to be placed within an area including the small base station of the small base station when a location of the terminal fails to be determined as a result of determination by the first determining unit 716.

The outdoor distance calculator 713 may calculate, using the path loss, a distance $r_{est,out}^H$ of the small base station based outdoors which indicates a distance between the small base station and the terminal when the terminal is presumed to be placed within an area excluding the small base station.

The outdoor distance calculator 713 may calculate, using the path loss between the macro base station and the terminal, a distance $r_{est,out}^M$ of the macro base station based outdoors which indicates a distance between the macro base station and the terminal when the terminal is presumed to be placed within an area excluding the small base station of the small base station when a location of the terminal fails to be determined as a result of determination by the first determining unit 716.

The inter base station distance calculator 714 may calculate a distance $d_H^M$ of base station which indicates a distance between the macro base station and the small base station, by receiving location information of the macro base station.

The first determining unit 716 may determine whether the terminal is placed within the area excluding the small base station by comparing a distance $r_{est,in}^H$ of the small base station based indoors and the distance $r_{est,out}^H$ of the small base station based outdoors to a radius $R_H$ available for a service, using the current amount of power, to be provided by the small base station. In this instance, the first determining unit 716 may determine the terminal to be placed within the area excluding the small base station in response to the radius $R_H$ being greater than the distance $r_{est,out}^H$ of the small base station based outdoors, and less than the distance $r_{est,in}^H$ of the small base station based indoors.

The second determining unit 718 may determine whether the terminal is placed within an area including the small base station or an area excluding the small base station based on the distance $r_{est,in}^M$ of the macro base station based indoors, the distance $r_{est,out}^M$ of the macro base station based outdoors, the distance $d_H^M$ of base station, and the radius $R_H$.

When one of a radius set by the distance $r_{est,out}^M$ of the macro base station based outdoors and a radius set by the distance $r_{est,in}^M$ of the macro base station based indoors intersects the radius $R_H$, the second determining unit 718 may determine that the terminal is placed within an area including the small base station in response to the radius $R_H$ intersecting the radius set by the distance $r_{est,in}^M$ of the macro base station based indoors. Further, the second determining unit 718 may determine that the terminal is placed within an area excluding the small base station in response to the radius $R_H$ intersecting the radius set by the distance $r_{est,out}^M$ of the macro base station based outdoors.

When neither a radius set by the distance $r_{est,out}^M$ of the macro base station based outdoors nor a radius set by the distance $r_{est,in}^M$ of the macro base station based indoors intersects the radius $R_H$, the second determining unit 718 may calculate a first distance corresponding to a distance between the radius set by the distance $r_{est,out}^M$ of the macro base station based outdoors and the radius $R_H$, and a second distance corresponding to a distance between the radius set by the distance $r_{est,in}^M$ of the macro base station based indoors and the radius $R_H$, and may determine the terminal to be the terminal located in a space including the small base station in response to the first distance being greater than or equal to the second distance, and to be the terminal located in a space excluding the small base station in response to the first distance being less than the second distance.

When both of a radius set by the distance $r_{est,out}^M$ of the macro base station based outdoors and a radius set by the distance $r_{est,in}^M$ of the macro base station based indoors intersect the radius $R_H$, the second determining unit 718 may calculate a third distance corresponding to a distance between the radius set by the distance $r_{est,out}^M$ of the macro base station based outdoors and the radius $R_H$, and a fourth distance corresponding to a distance between the radius set by the distance $r_{est,in}^M$ of the macro base station based indoors and the small base station, and determine the terminal to be the terminal located in a space including the small base station when the third distance is greater than or equal to the fourth distance, and to be the terminal located in a space excluding the small base station when the third distance is less than the fourth distance.

The controller 710 may control an overall operation of the small base station 700. The controller 710 may perform a function of the path loss calculator 711, the indoor distance calculator 712, the outdoor distance calculator 713, the inter-base station distance calculator 714, the first determining unit 716, the second determining unit 718. The controller 710, the path loss calculator 711, the indoor distance calculator 712, the outdoor distance calculator 713, the inter-base station distance calculator 714, the first determining unit 716, and the second determining unit 718 are separately illustrated to separately describe each function. Thus, the controller 710 may include at least one processor configured to perform each function of the path loss calculator 711, the indoor distance calculator 712, the outdoor distance calculator 713, the inter-base station distance calculator 714, the first determining unit 716, and the second determining unit 718. Further, the controller 710 may include at least one processor configured to perform a portion of each function of the path loss calculator 711, the indoor distance calculator 712, the outdoor distance calculator 713, the inter-base station distance calculator 714, the first determining unit 716, and the second determining unit 718.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of discriminating between a terminal located in a space including a small base station and a terminal located in a space excluding the small base station, the method comprising:

calculating a path loss between a small base station and a terminal;

calculating, using the path loss, a distance $r_{est,in}^H$ of the small base station based indoors indicating a distance between the small base station and the terminal when the terminal is presumed to be placed within an area including the small base station;

calculating, using the path loss, a distance $r_{est,out}^H$ of the small base station based outdoors indicating a distance between the small base station and the terminal when the terminal is presumed to be placed within an area excluding the small base station; and performing a first determining operation to determine whether the terminal is placed within the area excluding the small base station by comparing a distance $r_{est,in}^H$ of the small base station based indoors and the distance $r_{est,out}^H$ of the small base station based outdoors with a radius $R_H$ available for the small base station to provide a service using a current amount of power.

2. The method of claim 1, wherein the first determining operation determines the terminal to be placed within the area excluding the small base station in response to the radius $R_H$ being greater than the distance $r_{est,out}^H$ of the small base station based outdoors and less than the distance $r_{est,in}^H$ of the small base station based indoors.

3. The method of claim 1, wherein the calculating of the distance $r_{est,in}^H$ of the small base station based indoors comprises calculating the distance $r_{est,in}^H$ based on the path loss and a reference signal received power (RSRP) measured by the terminal.

4. The method of claim 1, wherein the calculating of the distance $r_{est,out}^H$ of the small base station based outdoors comprises calculating the distance $r_{est,out}^H$ based on the path loss, an RSRP measured by the terminal, and a path loss of a predetermined outdoor wall.

5. The method of claim 1, wherein, when the first determining operation fails to determine a location of the terminal, the method further comprises:
   receiving a transmission power and location information of a macro base station;
   calculating a path loss between the macro base station and the terminal;
   calculating, using the path loss between the macro base station and the terminal, a distance $r_{est,in}^M$ of the macro base station based indoors indicating a distance between the macro base station and the terminal when the terminal is presumed to be placed within an area including the small base station of the small base station;
   calculating, using the path loss between the macro base station and the terminal, a distance $r_{est,out}^M$ of the macro base station based outdoors indicating a distance between the macro base station and the terminal when the terminal is presumed to be placed within an area excluding the small base station of the small base station;
   calculating a distance $d_H^M$ of base station indicating a distance between the macro base station and the small base station; and
   performing a second determining operation that determines whether the terminal is placed within an area including the small base station based on the distance $r_{est,in}^M$ of the macro base station based indoors, the distance $r_{est,out}^M$ of the macro base station based outdoors, the distance $d_H^M$ of base station, and the radius $R_H$.

6. The method of claim 5, wherein calculating of the distance between the macro base station and the small base station comprises calculating the distance $d_H^M$ of base station based on the location information of the macro base station and location information of the small base station.

7. The method of claim 5, wherein a case in which the first determining operation fails to determine a location of the terminal corresponds to a case in which the radius $R_H$ is less than or equal to the distance $r_{est,out}^H$ of the small base station based outdoors, or the radius $R_H$ is greater than or equal to the distance $r_{est,in}^H$ of the small base station based indoors.

8. The method of claim 5, wherein the second determining operation determines that the terminal is located in the area including the small base station in response to an inequality $d_H^M - R_H < r_{est,in}^M < d_H^M + R_H$ being satisfied, and an inequality $d_H^M - R_H < r_{est,out}^M < d_H^M + R_H$ failing to be satisfied.

9. The method of claim 5, wherein the second determining operation determines that the terminal is located in the area including the small base station in response to an inequality $d_H^M - R_H < r_{est,in}^M < d_H^M + R_H$ being satisfied, an inequality $d_H^M - R_H < r_{est,out}^M < d_H^M + R_H$ being satisfied, and an inequality $|r_{est,in}^M - d_H^M| \leq |r_{est,out}^M - d_H^M|$ being satisfied.

10. The method of claim 5, wherein the second determining operation determines that the terminal is located in the area excluding the small base station in response to an inequality $d_H^M - R_H < r_{est,in}^M < d_H^M + R_H$ being satisfied, an inequality $d_H^M - R_H < r_{est,out}^M < d_H^M + R_H$ being satisfied, and an inequality $|r_{est,in}^M - d_H^M| \leq |r_{est,out}^M - d_H^M|$ failing to be satisfied.

11. The method of claim 5, wherein the second determining operation determines that the terminal is located in the area excluding the small base station in response to an inequality $d_H^M - R_H < r_{est,in}^M < d_H^M + R_H$ failing to be satisfied, and an inequality $d_H^M - R_H < r_{est,out}^M < d_H^M + R_H$ being satisfied.

12. The method of claim 5, wherein the second determining operation determines that the terminal is located in the area excluding the small base station in response to an inequality $d_H^M - R_H < r_{est,in}^M < d_H^M + R_H$ failing to be satisfied, an inequality $d_H^M - R_H < r_{est,out}^M < d_H^M + R_H$ failing to be satisfied, and an inequality $|r_{est,in}^M - d_H^M| \leq |r_{est,out}^M - d_H^M|$ failing to be satisfied.

13. The method of claim 5, wherein the second determining operation determines that the terminal is located in the area including the small base station in response to an inequality $d_H^M - R_H < r_{est,in}^M < d_H^M + R_H$ failing to be satisfied, an inequality $d_H^M - R_H < r_{est,out}^M < d_H^M + R_H$ failing to be satisfied, and an inequality $|r_{est,in}^M - d_H^M| \leq |r_{est,out}^M - d_H^M|$ being satisfied.

14. An apparatus for discriminating between a terminal located in a space including a small base station and a terminal located in a space excluding the small base station, the apparatus comprising:
   a path loss calculator to calculate a path loss between a small base station and a terminal;
   an indoor distance calculator to calculate, using the path loss, a distance $r_{est,in}^H$ of the small base station based indoors indicating a distance between the small base station and the terminal when the terminal is presumed to be placed within an area including the small base station;
   an outdoor distance calculator to calculate, using the path loss, a distance $r_{est,out}^H$ of the small base station based outdoors indicating a distance between the small base station and the terminal when the terminal is presumed to be placed within an area excluding the small base station; and
   a first determining unit to determine whether the terminal is placed within the area excluding the small base station by comparing a distance $r_{est,in}^H$ of the small base station based indoors and the distance $r_{est,out}^H$ of the small base station based outdoors with a radius $R_H$ available for providing, by the small base station, a service using a current amount of power.

15. The apparatus of claim 14, wherein the first determining unit determines the terminal to be placed within the area excluding the small base station in response to the radius $R_H$ being greater than the distance $r_{est,out}^H$ of the small base station based outdoors and less than the distance $r_{est,in}^H$ of the small base station based indoors.

16. The apparatus of claim 14, wherein:
   in a case where the first determining unit fails to determine a location of the terminal,
   the path loss calculator calculates a path loss between the macro base station and the terminal by receiving a transmission power from a macro base station, the indoor distance calculator calculates, using the path loss between the macro base station and the terminal, a distance $r_{est,in}^M$ of the macro base station based indoors indicating a distance between the macro base station and the terminal when the terminal is presumed to be placed within an area including the small base station of the small base station, and the outdoor distance calculator calculates, using the path loss between the macro base station and the terminal, a distance $r_{est,out}^M$ of the macro base station based outdoors indicating a distance between the macro base station and the terminal when the terminal is presumed to be placed within an area excluding the small base station of the small base station, and the apparatus further comprises:
an inter base station distance calculator to calculate a distance $d_H^M$ of base station indicating a distance between the macro base station and the small base station by receiving location information of the macro base station; and
a second determining unit to determine whether the terminal is placed within an area including the small base station based on the distance $r_{est,in}^M$ of the macro base station based indoors, the distance $r_{est,out}^M$ of the macro base station based outdoors, the distance $d_H^M$ of base station, and the radius $R_H$.

17. The apparatus of claim 16, wherein a case in which a location of the terminal fails to be determined as a result of determination by the first determining unit corresponds to a case in which the radius $R_H$ is less than or equal to the distance $r_{est,out}^H$ of the small base station based outdoors, or the radius $R_H$ is greater than or equal to the distance $r_{est,in}^H$ of the small base station based indoors.

18. The apparatus of claim 16, wherein, when one of a radius set by the distance $r_{est,out}^M$ of the macro base station based outdoors and a radius set by the distance $r_{est,in}^M$ of the macro base station based indoors intersects the radius $R_H$,
the second determining unit
determines that the terminal is placed within an area including the small base station in response to the radius $R_H$ intersecting the radius set by the distance $r_{est,in}^M$ of the macro base station based indoors, and
determines that the terminal is placed within an area excluding the small base station in response to the radius $R_H$ intersecting the radius set by the distance $r_{est,out}^M$ of the macro base station based outdoors.

19. The apparatus of claim 16, wherein, when neither of a radius set by the distance $r_{est,out}^M$ of the macro base station based outdoors nor a radius set by the distance $r_{est,in}^M$ of the macro base station based indoors intersects the radius $R_H$,
the second determining unit
calculates a first distance corresponding to a distance between the radius set by the distance $r_{est,out}^M$ of the macro base station based outdoors and the radius $R_H$, and a second distance corresponding to a distance between the radius set by the distance $r_{est,in}^M$ of the macro base station based indoors and the radius $R_H$, and
determines the terminal to be the terminal located in a space including the small base station in response to the first distance being greater than or equal to the second distance, and to be the terminal located in a space excluding the small base station in response to the first distance being less than the second distance.

20. The apparatus of claim 16, wherein, when both of a radius set by the distance $r_{est,out}^M$ of the macro base station based outdoors and a radius set by the distance $r_{est,in}^M$ of the macro base station based indoors intersect the radius $R_H$,
the second determining unit
calculates a first distance corresponding to a distance between the radius set by the distance $r_{est,out}^M$ of the macro base station based outdoors and the radius $R_H$, and a second distance corresponding to a distance between the radius set by the distance $r_{est,in}^M$ of the macro base station based indoors and the small base station, and
determines the terminal to be the terminal located in a space including the small base station in response to the first distance being greater than or equal to the second distance, and to be the terminal located in a space excluding the small base station in response to the first distance being less than the second distance.

* * * * *